(12) United States Patent
Eckstein et al.

(10) Patent No.: US 11,118,269 B2
(45) Date of Patent: Sep. 14, 2021

(54) METHOD FOR COATING A COLD-WORKED MULTI-CONE ANCHORING ELEMENT

(71) Applicant: Hilti Aktiengesellschaft, Schaan (LI)

(72) Inventors: Andreas Eckstein, Landsberg (DE); Remo Hutter, Kriessern (CH)

(73) Assignee: Hilti Aktiengesellschaft, Schaan (LI)

( * ) Notice: Subject to any disclaimer, the term of this patent is extended or adjusted under 35 U.S.C. 154(b) by 175 days.

(21) Appl. No.: 16/467,278

(22) PCT Filed: Dec. 4, 2017

(86) PCT No.: PCT/EP2017/081387
§ 371 (c)(1),
(2) Date: Jun. 6, 2019

(87) PCT Pub. No.: WO2018/114308
PCT Pub. Date: Jun. 28, 2018

(65) Prior Publication Data
US 2020/0071837 A1    Mar. 5, 2020

(30) Foreign Application Priority Data
Dec. 19, 2016  (EP) .................................. 16204930

(51) Int. Cl.
| | |
|---|---|
| *C23C 28/00* | (2006.01) |
| *C23C 26/00* | (2006.01) |
| *C25D 3/22* | (2006.01) |
| *C25D 5/48* | (2006.01) |
| *F16B 13/14* | (2006.01) |

(52) U.S. Cl.
CPC .............. *C23C 28/00* (2013.01); *C23C 26/00* (2013.01); *C25D 3/22* (2013.01); *C25D 5/48* (2013.01); *F16B 13/141* (2013.01)

(58) Field of Classification Search
CPC ....................................................... C23C 28/00
USPC ........................ 205/170, 191, 196, 224, 229
See application file for complete search history.

(56) References Cited

U.S. PATENT DOCUMENTS

| | | | | |
|---|---|---|---|---|
| 4,098,620 | A * | 7/1978 | Sato .......................... | B05D 7/16 428/551 |
| 4,305,687 | A * | 12/1981 | Parker ................. | E21D 21/0046 405/259.3 |
| 5,054,146 | A * | 10/1991 | Wiesenfeld .............. | B21H 8/00 470/16 |
| 6,395,162 | B1 * | 5/2002 | Watanabe .............. | C25D 13/22 204/471 |

(Continued)

FOREIGN PATENT DOCUMENTS

WO         88/07142          9/1988

OTHER PUBLICATIONS

Blandin et al., "Trends in the Automotive Paint Industry for Corrosion Protection," 2004, pp. 1-10. (Year: 2004).*

(Continued)

*Primary Examiner* — Edna Wong
(74) *Attorney, Agent, or Firm* — Grüneberg and Myers PLLC

(57) ABSTRACT

A cold-worked multi-cone anchoring element for chemical fastening technology is coated. The anchoring element detaches better from an injection mortar and exhibits both improved sliding properties and increased corrosion protection.

10 Claims, 3 Drawing Sheets

(56) References Cited

U.S. PATENT DOCUMENTS

| | | | |
|---|---|---|---|
| 2006/0008668 A1* | 1/2006 | Thomae | C25D 5/48 |
| | | | 428/615 |
| 2006/0228575 A1* | 10/2006 | Klos | F16B 33/008 |
| | | | 428/621 |
| 2007/0026154 A1* | 2/2007 | Yokoyama | B05D 7/00 |
| | | | 427/372.2 |

OTHER PUBLICATIONS

Blandin et al., "Trends in the Automotive Paint Industry for Corrosion Protection," (Jul. 1, 2004) Conference: EUROCORR 2004: long term prediction and modeling of corrosion, EUROCORR 2004—Prevision a long terme et modelisation de la corrosion, Nice (France), Sep. 12-16, 2004, pp. 1-11. (Year: 2004).*

Scott, "Environmentally Friendly Anticorrosion Coating for High Strength Fasteners," PPG Industries Inc Allison Park PA PPG Coatings and Resins Group (Jan. 1, 2011), pp. 1-42. (Year: 2011).*

Friel et al., "Acrylic Polymers as Coatings Binders," Paint and Coating Testing Manual: Fourteenth Edition, Ed. JV Koleske, ASTM Manual Series, Ann Arbor, MI (1995): 41, pp. 49-64. (Year: 1995).*

Puomi et al., "Replacement of Zinc Phosphating and E-Coating by a One-Step Primer?," Plating and Surface Finishing (Jan. 2008), vol. 95, No. 1, pp. 42-48. (Year: 2008).*

International Search Report dated Jan. 9, 2018 in PCT/EP2017/081387 with English translation.

Written Opinion dated Jan. 9, 2018 in PCT/EP2017/081387.

Anonymous, "Injection system Hilti HIT-HY 200-R with HIT-Z / HIT-Z-F / HIT-Z-R", European Technical Assessment—ETA-12/0028, Aug. 18, 2016 (Aug. 18, 2016), pp. 1-21.

Anonymous, "Non-Cleaning and Optimized for Corrosive Environments Hilti HIT-Z-F and HIT-HY 200 ultimate performance chemical anchor system", Brochure, 2016, pp. 1-6, XP055375119, https://www.hilti.dk/medias/sys_master/documents/heb/9215338184734/HIT-Z-F_Corrosion_Brochure_Brochure_ASSET_DOC_7134488.pdf.

Anonymous, "Tech Seal Silver WL 14", Datenblatt Kunz GmbH, Aug. 27, 2005 (Aug. 27, 2005), pp. 1-2, XP055375048, http://www.galvanoteknik.org/dosyalar/haytek/eng/TECHSEAL%20SILVER%20WL%2014.pdf.

Anonymous, "Zinklamellen-Technologie für höchste Korrosionsbeständigkeit in Silber", Brochure—Atotech Deutschland GmbH, May 2008 (May 2008), pp. 1-4, XP055375159, http://www.beteo.de/pdf/PI_ZincFlake_Silver_D.pdf.

* cited by examiner

METHOD FOR COATING A COLD-WORKED MULTI-CONE ANCHORING ELEMENT

This application is a National Stage entry under § 371 of International Application No. PCT/EP2017/081387, filed on Dec. 4, 2017, and which claims the benefit of European Application No. 16204930.8, filed on Dec. 19, 2016.

FIELD OF THE INVENTION

The invention relates to a method for coating a cold-worked multi-cone anchoring element for chemical fastening technology. In particular, the invention relates to a method for coating a cold-worked multi-cone anchoring element that detaches better from the chemical mortar and at the same time is characterized by improved sliding properties.

BACKGROUND OF THE INVENTION

Anchoring elements having different coatings are used in many ways in modern chemical fastening technology. Optimum corrosion protection of the anchoring elements is an indispensable prerequisite for this purpose.

For indoors use, anchoring elements of carbon steel for medium-weight and heavyweight fastenings usually receive an electrogalvanized coating of 5 µm to prevent rust film during transportation and use. For outdoors uses, stainless steels of various strength classes can be considered, but they are often overdimensioned with respect to corrosion and beyond that are significantly more expensive than the carbon steels.

Increased corrosion protection can also be achieved with hot-dip galvanization, which usually results, in the zinc bath, for example, in a coating thickness of at least 50 µm.

Due to the increased galvanization thickness, more intensive and longer-lasting corrosion protection is also assured therewith.

One alternative to increasing the corrosion properties of steels is a so-called protective coating, also known as top coating, which is applied via electrogalvanization. In contrast to hot-dip galvanization, the protective coating prevents the electrogalvanized zinc layer from attack by environmental influences and in this way achieves increased corrosion resistance.

During mass production of anchoring elements, the conventional chip-removing manufacture of dowels is partly replaced by cold-working, since this not only lowers the manufacturing costs but also hardens the steel and permits a smooth surface of the functional faces of the anchoring element to be obtained.

In chemical fastening technology, multi-cone anchor rods are used to achieve higher loads in cracked concrete and to avoid cleaning of the drilled holes. Due to the cones, a spreading effect is achieved that permits breakup of the mortar shell between drilled hole and anchoring element and thus on the one hand increases the retaining force of the chemical mortar on the drilled-hole wall and on the other hand permits expansion of the chemical system in the crack, thus leading to a significant load increase. The prerequisite for subsequent spreading is an initial minimum retaining force of the chemical mortar in the drilled hole and detachment and sliding between chemical mortar and multi-cone anchoring element during extraction in the crack. Normally the good detachment and sliding properties are achieved by coating the multi-cone anchoring element.

During chip-removing manufacture of multi-cone anchoring elements, hot-dip galvanization may be used without problems to increase the corrosion properties. In contrast, however, if cold-working is used for multi-cone anchoring elements, scale formation may take place on the surface during hot-dip galvanization and lead to large surface irregularities (FIG. 1). The reason for this is that the process of cold-working of the multi-cone anchoring element causes microscopic surface flaws, which become infiltrated by the heated zinc melt during hot-dip galvanization, become upright and, upon cooling, then leave behind large surface roughness at some points (FIGS. 2a and 2b). Furthermore, microscopically small steel particles close to the surface may also become detached and then included in the zinc layer (FIG. 3). Due to this rough surface, the multi-cone anchoring element may then be more difficult to detach from the chemical mortar and a significantly increased frictional resistance, which ultimately may lead to defective functioning of the chemical system and thus to significant load reductions, results during expansion in the crack situation.

An increased compressive strength of the multi-cone anchoring element may take place due to application of a protective coating and the prerequisite good detachment and sliding properties may be achieved by a protective coating having good separating and sliding properties. However, if the final coating having good separating and sliding properties is applied directly on the protective coating, the final coating is absorbed completely by the protective coating, and so the chemical mortar is no longer able to separate from the multi-cone anchoring element and also the multi-cone anchoring element is no longer able to slide (FIGS. 4a to 4d).

The object of the present invention is therefore to provide a method for coating a cold-worked multi-cone anchoring element that detaches better from the chemical mortar and at the same time is characterized by improved sliding properties and also overcomes the disadvantages of the prior art, and in particular is characterized by an improved, increased corrosion resistance.

SUMMARY OF THE INVENTION

The present invention relates to a method for coating a cold-worked multi-cone anchoring element for chemical fastening technology, comprising the following steps: provision of a cold-worked multi-cone anchoring element, electrogalvanization of the cold-worked multi-cone anchoring element, application of a protective coating, application of a primer and application of a final coating.

The present invention further relates to a multi-cone anchoring element, coated according to this method, for chemical fastening technology.

BRIEF DESCRIPTION OF THE FIGURES

FIGS. 4b and 4d show the respectively marked details of FIG. 4a and FIG. 4c, wherein only the zinc coat is evident;

FIGS. 5b and 5d show the respectively marked details of FIG. 5a and FIG. 5c, wherein the zinc layer and the growth layer are evident.

DETAILED DESCRIPTION OF THE INVENTION

Figure 1:
FIG. 1: Hot-dip galvanized cold-worked multi-cone anchoring element having scales and coarse surface roughnesses.
Figure 2A:
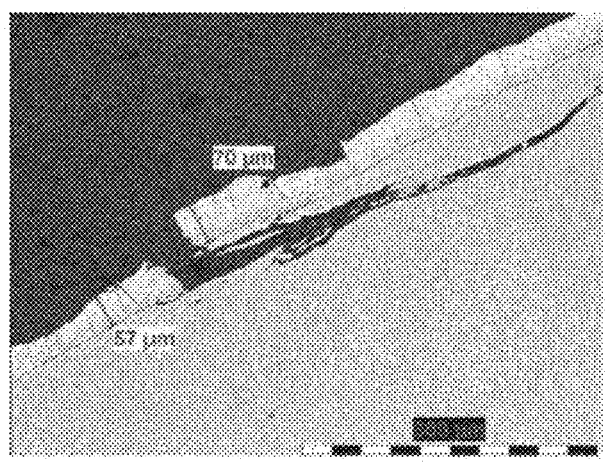
FIGS. 2a and 2b: Microscopic images of the surface of a hot-dip galvanized cold-worked multi-cone anchoring element having large surface roughness at some points.
Figure 2B:
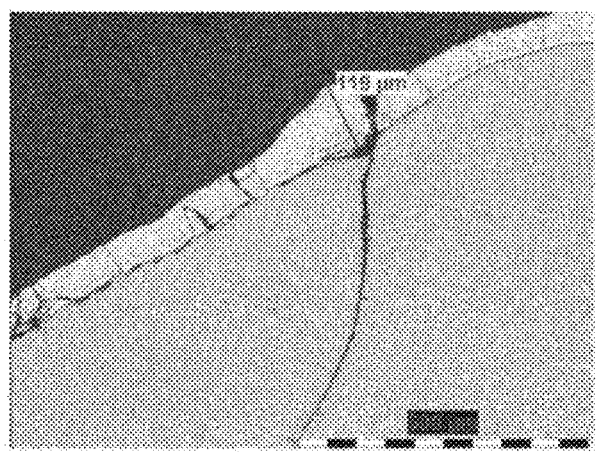
Figure 3:
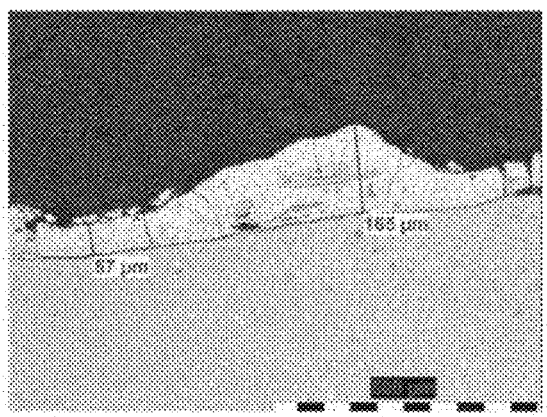
FIG. 3: Microscopic image of the surface of a hot-dip galvanized cold-worked multi-cone anchoring element having steel residues.
Figure 4A:
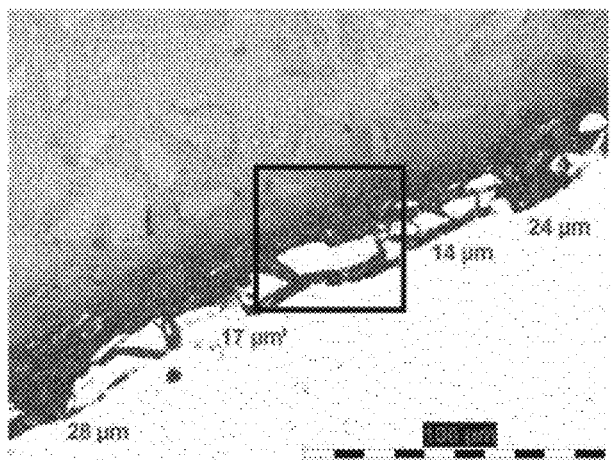
FIG. 4a to 4d: Microscopic images of the surface of a hot-dip galvanized cold-worked multi-cone anchoring element, wherein the final coating is applied directly on the protective coating, without primer.
Figure 4B:
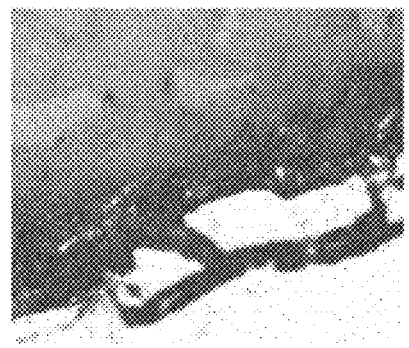
Figure 4C:
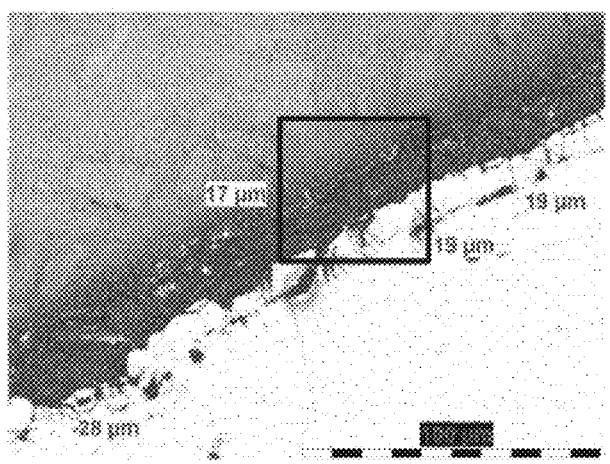
Figure 4D:

The following terms are used within the scope of the present invention:

As used within the scope of the present invention, the singular forms "one", "a" and "an" also include the corresponding plural forms, unless something different can be inferred unambiguously from the relationship. Thus, for example, the term "one" is intended to mean "one or more" or "at least one", unless otherwise indicated.

The term "protective coating" in the context of the present invention refers to a top layer or top-coating that seals the underlying layer.

The term "primer" in the context of the present invention refers to a primer or a primer coating that prevents the final coating from being absorbed by the protective coating.

The term "final coating" in the context of the present invention comprises a coating that is characterized by good separating and sliding properties.

In one aspect, the present invention relates to a method for coating a cold-worked multi-cone anchoring element for chemical fastening technology.

In another aspect, the present invention further relates to a cold-worked multi-cone anchoring element, coated according to this method, for chemical fastening technology.

It has been found that the inventive method is particularly suitable for coating, in simple, continuous, economic and inexpensive manner, a cold-worked multi-cone anchoring element, which detaches better from the chemical mortar and at the same time is characterized by improved sliding properties.

Therefore it is one objective of the present invention to describe a method for coating a cold-worked multi-cone anchoring element for chemical fastening technology. Furthermore, it is an objective of the present invention to describe a multi-cone anchoring element, coated according to this method, for chemical fastening technology.

The method of the present invention for coating a cold-worked multi-cone anchoring element for chemical fastening technology comprises the following steps: i) provision of a cold-worked multi-cone anchoring element, ii) electrogalvanization of the cold-worked multi-cone anchoring element, iii) application of a protective coating, iv) application of a primer and v) application of a final coating.

In a first step, a cold-worked multi-cone anchoring element is provided. Preferably, the cold-worked multi-cone anchoring element is made of carbon-containing steel (carbon steel) with increased corrosion resistance.

In a next step, electrogalvanization of the cold-worked multi-cone anchoring element is carried out. The electrogalvanization (coating with a ZnNi alloy) takes place with bulk material in a clearly defined workflow according to the current version of DIN 50979. Coating takes place preferably as mass bulk coating and comprises filling of the multi-cone anchor rods into a plastic drum and passage through the coating system having the following steps: pretreatment, electrochemical ZnNi coating; passivation by chemical post-treatment, drying and passivation according to specification: Fe//ZnNi8//An//T0. Fe relates to the base material, in the present case steel; the ZnNi alloy coat has a proportion by mass of preferably 12% to 16% nickel and 8 refers to the smallest local layer thickness of 8 μm at the defined measurement point; An stands for transparent passivated—colorless to iridescent colored; and T0 means without sealing.

Electrogalvanization may also be carried out in the hanging method or else by means of spraying methods. Preferably, electrogalvanization is carried out by dipping the multi-cone anchoring elements. In the method of the present invention, electrogalvanization is carried out at a current density in the range of 0.5 to 1.0 $A/dm^2$, preferably at a current density of 0.8 $A/dm^2$.

Inspection of the electrogalvanized cold-worked multi-cone anchoring element takes place by means of the current version of DIN EN ISO 3497, for example by means of the x-ray fluorescence method, The inspection is carried out on 15 pieces of randomly selected parts, and it must conform to the above specifications.

In a next step, a protective coating, also known as top coating, is applied. In the method of the present invention, this protective coating is preferably an organic protective coating, especially an organic protective coating with a minimum baking temperature of 170° C. and a baking time of approximately 30 minutes. An example of such a protective coating is the "Techseal® Silver WL4" coating of Atotech Deutschland GmbH. The coating is applied at room temperature, preferably by dipping a cage filled with anchoring elements into a tank filled with liquid coating. In particular, the protective coating is applied by dipping of the multi-cone anchor rods. Then the cage is removed from the tank and spun, in order to achieve a homogeneous distribution of the protective coating on the individual anchoring elements. In particular, spinning takes place at a speed in the range of 100 to 400 rpm, preferably of 150 to 300 rpm, for a spin duration in the range of 10 to 30 s, preferably from 15 to 25 s. Preferably, the coating is then baked for 30 minutes at a temperature of at least 170° C. This coating process is carried out two or more times.

The layer thickness of the protective coating is determined by a microscopic measurement according to the current version of DIN EN ISO 1463. The measurement takes place as part of the first sample test. The test is carried out on 3 pieces of randomly selected parts after two coating processes. The layer thickness is determined by means of a transverse microsection through the shank. The layer thickness is measured at respectively 3 measurement points (4, 8 and 12 hours). The average values of these measurements yield the mean layer thickness for the protective coating. By level monitoring, it is ensured that all individual parts are coated. Preferably, the quality of the solution is monitored with respect to possible impurities. If necessary, the solution must be filtered or replaced, since over time it may become contaminated by particles, such as zinc, dust or abraded matter, for example. This is necessary to ensure that the quality of the coating is constant.

In a next step, a base coat, also known as primer, is applied. In the method of the present invention, this primer is preferably an organic binder system on an acrylate basis, especially an organic binder system on an acrylate basis, with a maximum baking temperature of 180° C. and a baking time of approximately 30 minutes. An example of such an organic binding system is "Primer W11 light" of Verzinkerei Kriessern AG. The coating is applied at room temperature by dipping a cage filled with multi-cone anchoring elements into a tank filled with liquid primer. Preferably, the primer is applied by dipping the multi-cone anchoring elements. Then the cage is removed from the tank and spun, in order to ensure a uniform distribution of the primer on the individual anchoring elements. In particular, spinning takes place at a speed in the range of 100 to 400 rpm, preferably of 150 to 300 rpm, for a spin duration in the range of 1 to 5 minutes, preferably 2 to 3 minutes. Preferably, the coating is then baked for 30 minutes at a maximum of 180° C.

By level monitoring, it is ensured that all individual parts are coated. Preferably, the quality of the solution is monitored with respect to possible impurities. If necessary, the solution must be filtered or replaced, since over time it may become contaminated by particles, such as zinc, dust or abraded matter, for example. This is necessary to ensure that the quality of the coating is constant.

In a next step, a final coating is applied. In the method of the present invention, this final coating is preferably a wax coating, especially a Licowax® or Vestowax® coating. In a preferred embodiment, the wax coating is a Licowax® coating. This Licowax® coating comprises at least 2 weight percent of Licowax® PED 522 (Clariant). If necessary, an active proportion of durably fluorescing additives may be included, such as a fluorescent powder (Ciba, UVITEX OB), for example.

The final coating is applied by the method of dipping in the bulk material. A uniform distribution of the final coating on the multi-cone anchoring elements is ensured by a spinning process prior to drying. All multi-cone anchoring elements must be wetted completely and uniformly with the final coating. This coating process is carried out two times. Preferably, the final coating is applied by dipping the multi-cone anchoring elements. Then the cage is removed from the tank and spun, in order to ensure a uniform distribution of the final coating on the individual anchoring elements. In particular, spinning takes place at a speed in the range of 100 to 400 rpm, preferably of 150 to 300 rpm, for a spin duration in the range of 1 to 5 minutes, preferably of 2 to 3 minutes. Preferably, the quality of the solution must be monitored with respect to possible impurities. If necessary, the solution must be filtered or replaced, since over time it may become contaminated by particles, such as zinc, dust or abraded matter, for example. This is necessary to ensure that the quality of the coating is constant.

The final coating may also be applied in the hanging method or else by means of spraying methods.

The products are inspected for the presence of the coating under a suitable light source (UV/black light). The inspection is carried out on 5 pieces of randomly selected parts, and is known to the person skilled in the art.

The final inspection of the coasted multi-cone anchoring elements is carried out by determining the "H feature". The H-feature is a special measure or a special annotation of a drawing, with very great importance for the overall function of the product. As a rule, this H-feature is subject to special quality assurance. Assurance that the H-feature requirements are fulfilled is obtained upon compliance of the first layer (ZnNi) with the minimum layer thickness and of the process monitoring for the second, third and fourth steps.

The corrosion test is performed by the following corrosion tests on the finished product during the first sample test: ISO 20340—Cyclic corrosion test with UV, deep-freezing and salt-spray test—Test for premature failure—Duration 5 weeks (5 cycles); ISO 16701—Cyclic corrosion test (humidity and temperature cycles, chlorides)—Long-term behavior—Duration 12 weeks. The corrosion test assures the quality of the multi-cone anchoring elements.

EXEMPLARY EMBODIMENT

Cold-worked multi-cone anchoring elements coated according to the method of the present invention, i.e. conical anchor rods having an M12 connecting thread, 196 mm (HIT-Z, Hilti Co.) as well as multi-cone anchoring elements coated according to the prior art as comparison were set together with a chemical mortar (HIT-HY 200-A, hybrid high-performance injection mortar of the Hilti Co.) in a wet drilled hole in C20/25 having a depth of 60 mm and cured at room temperature for 24 hours. Load ratings of 17 kN in the static 0.3 mm parallel crack were achieved by multi-cone anchoring elements coated according to the prior art. The rough surface of the anchoring elements coated according to the prior art caused very difficult detachment from the chemical mortar and a significantly increased frictional resistance during expansion in the crack situation, which ultimately leads to defective functioning of the dowel system and thus to significant load reductions. In comparison with this, load ratings of 27 kN were achieved under the same conditions with anchor rods coated according to the method of the present invention. This may be attributed to good separating and sliding properties.

Figure 5A:
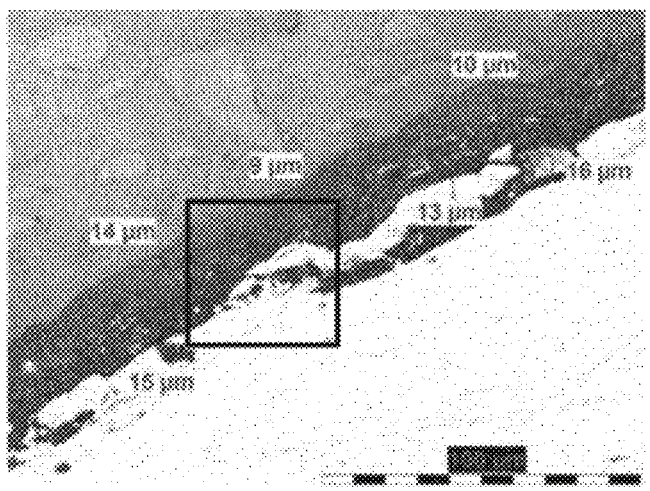
FIG. 5a to 5d: Microscopic images of the surface of a hot-dip galvanized cold-worked multi-cone anchoring element, wherein the final coating is applied directly on the primer.
Figure 5B:
Figure 5C:
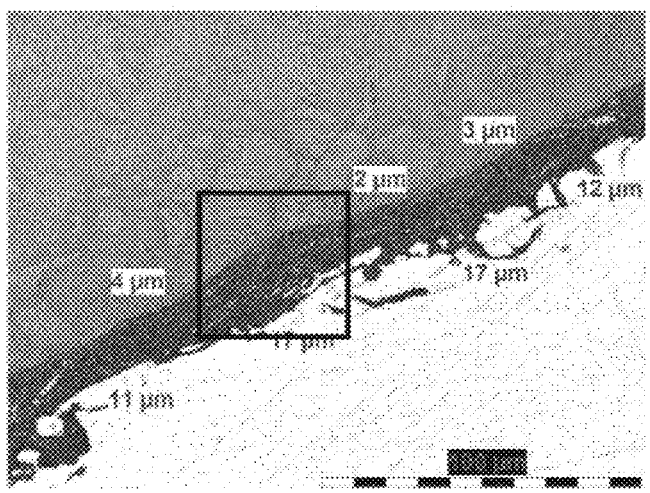
Figure 5D:
Figure 6:
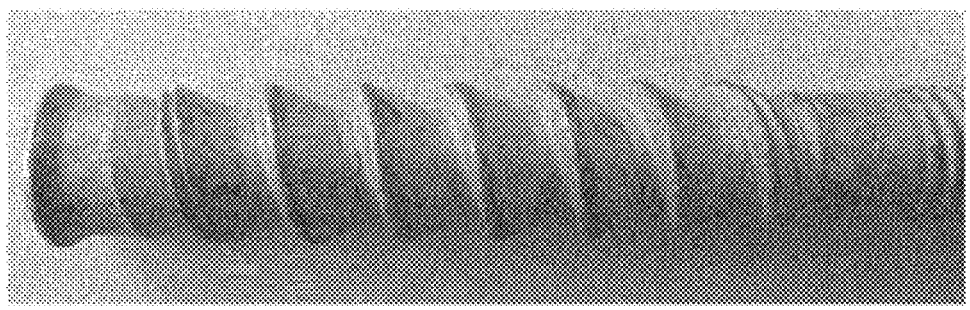
FIG. 6: Cold-worked multi-cone anchoring element coated with the method of the present invention.

Microscopic images show that the method of the present invention produces a coated multi-cone anchoring element having a surface without surface roughness and without inclusion of steel particles in the zinc layer (FIG. 5a to 6). Furthermore, the primer prevents the final coating from being absorbed by the protective layer, and so the final coating is able to achieve its good separating and sliding properties. Furthermore, the multi-cone anchoring element is characterized by improved increased corrosion protection.

The microscopic images are obtained by microsections in cold-embedded medium. For this purpose, the samples are cut off on the Brilliant 221 precision cutting machine of ATM, then pre-ground and embedded with the transparent cold-embedding agent Technovit 4006SE of the Kulzer Co. The metallographic examination and creation of photos were carried out with the DM 4000M metal microscope of the Leica Co. at magnifications of 25:1 and 500:1 (FIG. 2a to 5b).

The invention claimed is:

1. A method for coating a cold-worked multi-cone anchoring element for chemical fastening technology, comprising:
   i) electrogalvanizing a cold-worked multi-cone anchoring element,
   ii) applying a protective coating on the electrogalvanized cold-worked multi-cone anchoring element,
   iii) applying a primer on the protective coating, and
   iv) applying a final coating on the primer,
   wherein the primer comprises an organic binder system on an acrylate basis,
   wherein the final coating is a wax coating, and
   wherein the protective coating is an organic protective layer.

2. The method according to claim 1, in which i) comprises dipping of the cold-worked multi-cone anchoring element at a current density in the range of 0.5 to 1.0 $A/dm^2$.

3. The method according to claim 1, in which ii) further comprises baking of the protective coating.

4. The method according to claim 3, in which the protective coating is baked for 30 minutes at a minimum of 170° C.

5. The method according to claim 1, in which iii) further comprises baking of the primer.

6. The method according to claim 5, in which the primer is baked for 30 minutes at a maximum of 180° C.

7. The method according to claim 1, in which the protective coating is an organic protective layer having a minimum baking temperature of 170° C. and a baking time of approximately 30 minutes.

8. The method according to claim 1, in which the primer is an organic binder system on an acrylate basis, having a maximum baking temperature of 180° C. and a baking time of approximately 30 minutes.

9. The method according to claim 1, in which the cold-worked multi-cone anchoring element consists of carbon-containing steel with increased corrosion resistance.

10. The method according to claim 1, wherein the protective coating is applied directly to the electrogalvanized cold-worked multi-cone anchoring element, the primer is applied directly to the protective coating, and the final coating is applied directly to the primer.

* * * * *